United States Patent
Deri et al.

(10) Patent No.: US 6,411,418 B1
(45) Date of Patent: Jun. 25, 2002

(54) HIGH-PERFORMANCE PARALLEL PROCESSORS BASED ON STAR-COUPLED WAVELENGTH DIVISION MULTIPLEXING OPTICAL INTERCONNECTS

(75) Inventors: Robert J. Deri, Pleasanton; Anthony J. DeGroot, Castro Valley, both of CA (US); Ronald E. Haigh, Arvada, CO (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/289,342

(22) Filed: Apr. 9, 1999

Related U.S. Application Data

(63) Continuation of application No. PCT/US97/18364, filed on Oct. 15, 1997.
(60) Provisional application No. 60/028,429, filed on Oct. 15, 1996.

(51) Int. Cl.[7] ............................ H04B 14/02; H04J 14/02
(52) U.S. Cl. ...................... 359/180; 359/181; 359/188; 359/125
(58) Field of Search ................................ 359/124, 125, 359/132, 133, 180, 181, 188

(56) References Cited

U.S. PATENT DOCUMENTS

| | | | |
|---|---|---|---|
| 4,873,681 A | 10/1989 | Arthurs et al. ................. 370/3 |
| 5,077,728 A | 12/1991 | Kaminow ................... 359/124 |
| 5,347,525 A | 9/1994 | Faris ............................. 372/19 |
| 5,367,642 A | 11/1994 | Dally ......................... 395/325 |
| 5,394,489 A | 2/1995 | Koch ........................... 385/14 |
| 5,446,572 A | 8/1995 | Husbands et al. .......... 359/133 |
| 5,475,857 A | 12/1995 | Dally .......................... 395/800 |
| 5,483,369 A | 1/1996 | Darcie et al. ................ 359/126 |
| 5,485,297 A | 1/1996 | Sotom ......................... 359/123 |
| 5,495,356 A | 2/1996 | Sharony et al. ............. 359/128 |
| 5,506,712 A | 4/1996 | Sasayama et al. .......... 359/123 |
| 5,576,881 A | 11/1996 | Doerr et al. ................. 359/333 |
| 5,663,822 A | 9/1997 | Fee ............................. 359/161 |
| 5,729,369 A | 3/1998 | Zirngibl ...................... 359/110 |
| 5,801,859 A * | 9/1998 | Yamamoto ................... 359/119 |
| 5,912,751 A * | 6/1999 | Ford et al. ................... 359/128 |

OTHER PUBLICATIONS

Payne et al, "Wavelength Switched, Passively Coupled, Single Mode Optical Networks", 100C–ECOC '85, pp. 585–588.

(List continued on next page.)

Primary Examiner—Leslie Pascal
(74) Attorney, Agent, or Firm—John P. Wooldridge; Alan H. Thompson

(57) ABSTRACT

As the performance of individual elements within parallel processing systems increases, increased communication capability between distributed processor and memory elements is required. There is great interest in using fiber optics to improve interconnect communication beyond that attainable using electronic technology. Several groups have considered WDM, star-coupled optical interconnects. The invention uses a fiber optic transceiver to provide low latency, high bandwidth channels for such interconnects using a robust multimode fiber technology. Instruction-level simulation is used to quantify the bandwidth, latency, and concurrency required for such interconnects to scale to 256 nodes, each operating at 1 GFLOPS performance. Performance scales have been shown to ≈100 GFLOPS for scientific application kernels using a small number of wavelengths (8 to 32), only one wavelength received per node, and achievable optoelectronic bandwidth and latency.

13 Claims, 3 Drawing Sheets

OTHER PUBLICATIONS

"Wavelength Division Multiaccess Network Using Component Centralization, Local Oscillator Injection Locking and Homodyne Detection," IBM Technical Disclosure Bulletin, Feb. 1988, vol. 30, No. 9, pp. 262–267.

Mohsen Kavehrad and Mahmoud Tabiani, "Selective-Broadcast Optical Passive Star Coupler Design for Dense WDM Networks," IEEE Photonics Technology Letters, vol. 3, No. 5, pp. 487–489, May 1991.

William J. Dally, "Express Cubes: Improving the Performance of k–ary n–cube Interconnection Networks," IEEE Transactions on Computers, vol. 40, No. 9, pp. 1016–1023, Sep. 1991.

H. Obara and Y. Hamazumi, "Star Coupler Based WDM Switch Employing Tunable Devices with Reduced Tunability Range," Electronics Letters, vol. 28, No. 13, pp. 1268–1270, Jun. 18, 1992.

* cited by examiner

HIGH-PERFORMANCE PARALLEL PROCESSORS BASED ON STAR-COUPLED WAVELENGTH DIVISION MULTIPLEXING OPTICAL INTERCONNECTS

CROSS REFERENCE TO RELATED APPLICATION

This application is a continuation of International Application PCT/US97/1836.4, filed on Oct. 15, 1997, which was filed within one year of U.S. Provisional Appln. No. 60/028,429, filed on Oct. 15, 1996, and is based thereon. U.S. Provisional Appln. No. 60/028,429 forms a part hereof and is incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to wavelength division multiplexed (WDM) optical systems, and more specifically, it relates to optical systems, in which independent channels on different optical wavelengths are simultaneously broadcast to many nodes over a star coupler.

2. Description of Related Art

A key barrier to higher performance levels in massively parallel processors (MPPs) is the communication limits that exist among the individual processors, and between the processors and main memory. Such communication limits include delays in message transmission that could be reduced, e.g., by increasing the transmission bandwidth. The time delay for transmission of a large message reduces in proportion with the transmission bandwidth of the communication link transporting the data. Additional time delays between initial message transmission and reception stem from the use of information packets that are relayed many times, e.g., in a bucket-brigade fashion from node-to-node within a communication fabric. At each such node, the packet address header is read to route each message packet appropriately to its intended destination. If this occurs more than once, unnecessary latency in the delivery of the message packet is added and can stall processors waiting for the data. Performance suffers when the processors are starved of needed data. The processors cannot continue until all the required packets are received. The efficiency of parallel systems falls off as systems are scaled up to include more processors because of the above-mentioned latency and bandwidth limitations. As the system size, measured in number of processors, grows, each processor spends more time waiting for data. Such problems have been encountered by the Cray Research Torus program with three-dimensional interwoven rings, the Intel Paragon mesh program with two-dimensional rings without wrap-around, and the Convex Exemplar program where the symmetric multiprocessor (SMP) groups are on parallel rings.

Multiprocessing is of great current interest for both general high performance computing applications, massively parallel processing, and integrated sensor/processor systems. Increases in system node count, computing power per node, and/or sensor-generated data rate increase the communication required to maintain a balanced system that fully utilizes available computing power and sensor data. Traditional electronic solutions are not keeping pace with advances in processor performance and sensor complexity, and have increasing difficulty providing sufficient communication bandwidth. The trend towards shared memory (away from message passing) in multiprocessors places additional stress on inter-processor communications due to the short messages and rapid memory access associated with cache-to-cache coherence traffic.

The difficulty of providing sufficient communication resources between processor and memory elements in parallel, multiprocessor systems has led to many proposals to employ optical interconnects for improved bandwidth and latency. These proposals are driven by communication requirements anticipated from significant increases in computing power per node (1 GFLOPS per CPU near term) and system node count, and the recognition that traditional electronic interconnects will have increasing difficulty in meeting these requirements. Enhanced interconnects are required to provide sufficiently rapid access to remote, distributed memory so that available computing power is fully utilized for applications requiring tightly coupled multiprocessing. Cache-coherent, shared memory operation places additional stress on inter-element communications due to the short messages and rapid memory access associated with cache-to-cache coherence traffic.[6] In addition, rapid remote access can significantly improve memory requirements, and thus system cost, for certain scientific codes (e.g.: in which complex, underlying physics is represented by look-up tables), because large quantities of read-only data need not be replicated locally.

It is well known that the latency in a communications fabric can be reduced by increasing the "degree" of the network, which is the number of nodes (processors, memories or sensors) which can be accessed for communication by a given node without the necessity of intervening routing logic. A high network degree minimizes the number of times a packet header is processed en route to its destination, and thus minimizes the latency. This has led to several proposals to use fiber optic interconnects for multiprocessors, because the fiber optic media enables a broadcast architecture involving many nodes—that is, a high network degree. The typical architecture involves a broadcast architecture (embodied as a star coupler) and wavelength-selectable node transmitters. The multiple optical wavelengths in the network enable multiple, simultaneous communication transmissions involving different sets of source/destination node pairs.

The use of wavelength-division-multiplexed (WDM) optical systems (FIG. 1), in which independent channels on different optical wavelengths are simultaneously broadcast to a large number (e.g.: hundreds) of nodes over a star coupler, is an attractive proposal for multiprocessor interconnects, offering the potential for wide-bandwidth, single-hop communications among all nodes. Each wavelength provides an independent, concurrent logical bus channel. With sufficient system wavelengths, it provides a non-blocking crossbar interconnect (output contention only), and can lead to a knockout switch (no output contention) given sufficient receiver resources. While scaling of such systems is ultimately limited by the optical power budget and bandwidth limitations of the optical transceiver technology, use of bridged WDM star couplers as multi-ported ported routers or spanning busses can enable scaling to higher node count. The large degree/fanout of such routers/busses is attractive for minimizing system diameter and global communication latency.

In previously proposed, conventional architectures of this type, in which a single pair of optical fibers is used to transport information to and from each node, there exists a fundamental tradeoff between the number of nodes on the star coupler (the network degree) and the transmission bandwidth. An information source must provide sufficient optical power to transmit to many destinations simultaneously because optical receivers will not produce error-free outputs unless they receive strong optical signals. The required optical signal strength increases with increasing bandwidth. When there are a lot of destinations, and the node degree increases, a larger amount of power is required. However, optical power cannot be increased indeterminately because of other system constraints, including the cost of high power laser transmitters, maximum device power limits, and the desire to operate with "eye-safe" laser powers in the network. These constraints on maximum transmission power will force the system to operate with lower transmission bandwidth when the number of nodes on a star coupler is increased. This is an undesirable option, which occurs in a variety of multiwavelength optical architectures based on broadcast-and-select type architectures, including those using n-to-n broadcast, n-to-n star couplers, or n-to-1 combining in the optical domain suffer from the power inefficiencies of 1/n, where n is the number of nodes on the network. The hardware design is complicated as more wavelengths are required to be emitted from each node in a system.

Examples of the type of architecture described above are presented by

Charles Husbands in U. S. Pat. No. , 5,446,572;

E. Arthurs et al., *Electron. Lett.* 24, 119 (1988);

K. Ghose, "Performance Potentials Of An Optical Fiber Bus Using Wavelength Division Multiplexing", *Proc. SPIE* 1849, 172–183 (1993);

M. Goodman et al, "The LAMBDANET Multiwavelength Network", IEEE J. Sel. Areas in Communications vol. 8, no 6, pp 995–1004 (1990); and H. Obara and Y. Hamazumi, in "Star Coupler Based Wavelength Division Multiplexer Switch Employing Tunable Devices With Reduced Tunability Range", Electronics Letters, Jun. 18, 1992; Vol. 28, No. 13, pp. 1268–1270.

Charles Husbands describes in U. S. Pat. No. 5,446,572, a broadcast architecture in which the optical power is broadcast from each transmitter into a common channel connected to every receiver in the system. Such combining reduces the power available to each connection by 1/n, where n is the number of wavelength division multiplexers being combined. So a lot of optical power is required from each transmitter to begin with, and the transmitter power must be increased with each transmitter/receiver node added to a system. High levels of optical power reduce reliability, increase power consumption, and can prevent the system from being "eye safe" for maintenance personnel. But reducing the overall power even as the number of nodes increase forces lower bit rates, because the receiver sensitivity requirements for error-free operation at high bit rate will be exceeded.

Sasayama et al., describe in U. S. Pat. No. 5,506,712, a time-slotted, synchronized wavelength division multiplexing approach to connect each of m node inputs to some number of outputs. It employs a wavelength router instead of an optical star coupler to overcome the optical power splitting associated with a star coupler. Such frequency routers typically introduce an optical attenuation which increases with the number of inputs and outputs on the router, and therefore impose the same tradeoff of network degree versus transmission bandwidth as discussed above.

Sotom describes in U.S. Pat. No. 5,485,297, an optical switch that uses tunable wavelength division multiplexing sources, and optical switch matrices plus star couplers to route wavelength division multiplexing transmissions to a particular destination. The purpose of the switches is to minimize the size of the star coupler to improve optical power utilization and minimize the number of system wavelengths required by routing messages on the same wavelength to different star couplers. The disadvantage of this approach is the need for a centralized control that analyzes the traffic pattern for the inputs and then sets all the switches to make sure two signals on the same wavelength never go to the same star. This kind of centralized control is slow, complex, and costly.

Sharony et al. describes in U.S. Pat. No. 5,495,356, a time-slotted approach that requires global synchronization. Optical space switches, e.g., photonic switches in FIG. 4 of the patent, or wavelength switching are used for wavelength selective switching. Centralized control is needed to operate such switches, which is complex, slow, and costly. Sharony et al. also uses 1:n splitting which is power inefficient, and has limited switch tuning times.

M. Kavehrad and M. Tabiani describe in, "Selective Broadcast Optical Passive Star Coupler Design For Dense Wavelength Division Multiplexer Networks", *IEEE Photonics Letters*, vol. 3, no. 5, May 1991, pp. 487–489, reducing the splitting loss power inefficiency by selectively broadcasting through an optical star coupler to limit broadcasts to only a few nodes. The proposed device appears complicated to build, and attempts to tradeoff splitting losses against the number of system wavelengths used. cl SUMMARY OF THE INVENTION It is an object of the present invention to provide wavelength-division-multiplexed (WDM) optical systems, in which independent channels on different optical wavelengths are simultaneously broadcast to many (over 100) nodes over a star coupler with a large transmission bandwidth.

The invention offers wide-bandwidth, single-hop communications among a large number of nodes. Each wavelength provides an independent, concurrent logical bus channel. With sufficient system wavelengths, it provides a non-blocking crossbar interconnect (output contention only), and can lead to a knockout switch (no output contention) given sufficient receiver resources (e.g., LAMBDANET). While scaling of such systems is ultimately limited by optical power budget and transceiver bandwidth, use of bridged WDM star couplers as multi-ported routers or spanning busses enables scaling to higher node count. The large degree of such routers is attractive to reduce system diameter and global communication latency. An embodiment of the invention includes a basic WDM star-coupled system. The invention addresses the concern that the interconnect hardware provides robust, scalable performance at the level at or beyond 100 sustained GFLOPS and a few hundred nodes.

An embodiment of a transmitter module design of the present invention provides ≈1 nsec wavelength selection, broadcast capability, and large output power using a single module containing two optoelectronic chips. The first chip contains an array of laser diodes, each emitting at a different wavelength. The second chip contains two arrays of semiconductor optical amplifiers (SOAs) interconnected by a passive star coupler. The lasers emit continuously and may be collimated and focused by micro-optics. The transmitter wavelength is selected in the optical domain by using a first SOA array as an electro-optic switch. A wavelength select circuit controls this first SOA array. The second SOA array is controlled by an electronic driver array and provides modulators to impress word-wide electronic data onto the word-wide spatial channels (a multimode fiber array) realized via broadcast over the star coupler.

DETAILED DESCRIPTION OF THE INVENTION

Figure 1:
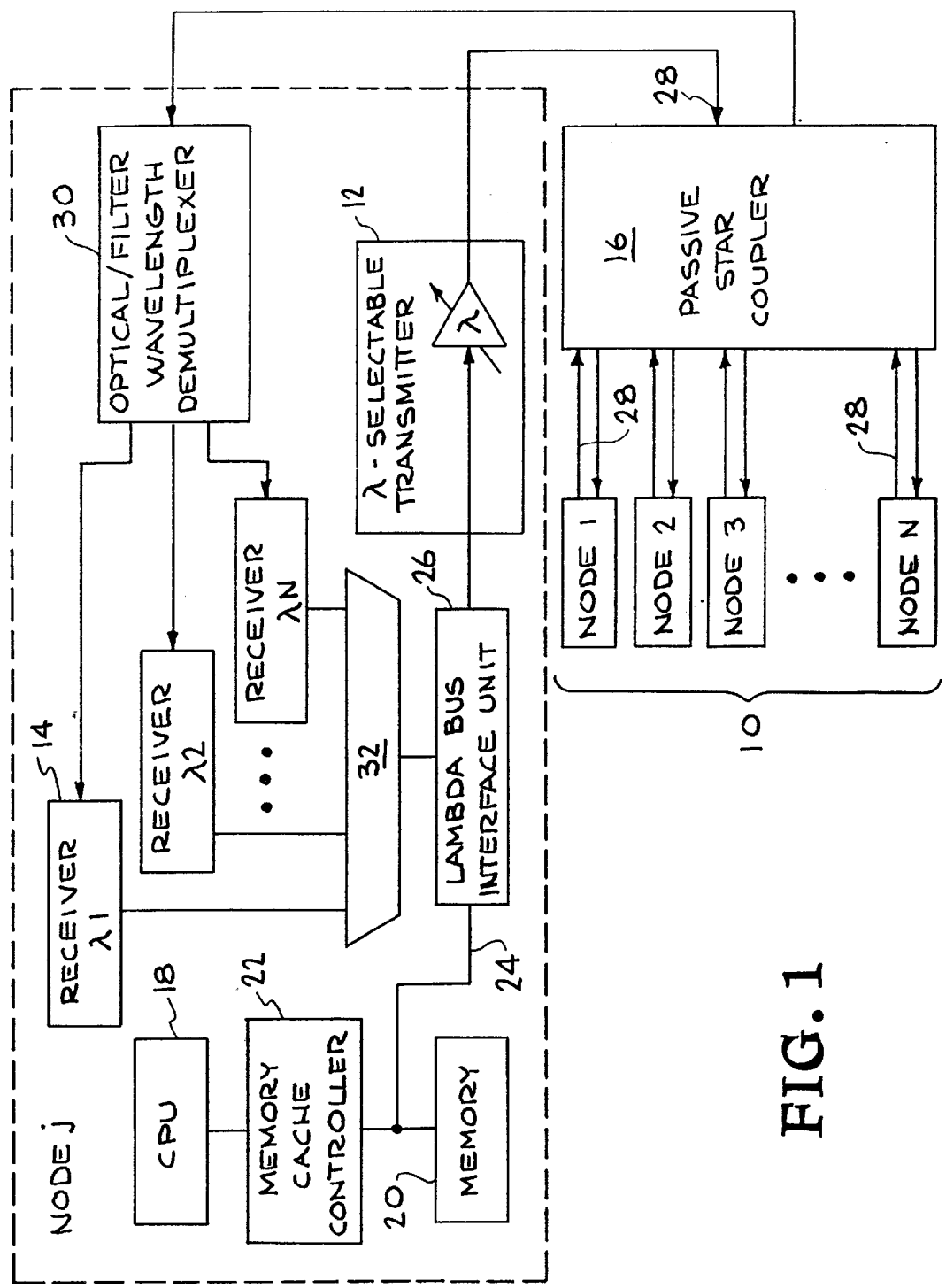
FIG. 1 shows a schematic of an embodiment of LambdaBus.

The invention is wavelength-division-multiplexed (WDM) optical systems (FIG. 1), in which independent channels on different optical wavelengths are simultaneously broadcast to many nodes over a star coupler. These systems are attractive for multiprocessor interconnection, offering wide-bandwidth, single-hop communications among all nodes. Each wavelength provides an independent, concurrent logical bus channel. With sufficient system wavelengths, it provides a non-blocking crossbar interconnect (output contention only), and can lead to a knockout switch (no output contention) given sufficient receiver resources. While scaling of such systems is ultimately limited by optical power budget and transceiver bandwidth, use of bridged WDM star couplers as multi-ported routers or spanning busses enables scaling to higher node count. That is, multiple copies of the star-coupled unit can be interconnected to extend the system to a larger number of nodes. The large degree of such routers is attractive to reduce system diameter and global communication latency. As shown in FIG. 1, the system comprises a set of nodes 10 (computers, sensors, anything that generates communication traffic or receives communication traffic), transmitters 12 and receivers 14 on each node, and the star coupler 16. FIG. 1 shows the situation when the nodes (Node j) are computer systems, which contain a central processing unit (CPU) 18, memory (M) 20, and a memory/cache controller (CC) 22 which communicate with one another by means of a conventional electronic data bus (cpu bus) 24. This node configuration is illustrative and doesn't limit the invention. For this system, a message is sent from one node to another as follows:

1. The message is originated by either the CPU or the CC. It flows over the cpu bus to the LambdaBus interface unit 26.
2. The LambdaBus interface unit 26 is an electronic module that performs the following functions for transmission:
    a. It computes additional bits of data and attaches these bits to the message. The additional bits support low-level communications protocol, which can be one of any number of protocols (e.g.: HIPPI, SCI, ethernet, or some new protocol). The bits provide a means for the receiving node to check whether the message was corrupted by noise during transmission (error checking or correcting code), indicates the identity of the transmitting node, indicates the identity of the receiving node, may include information about the priority of the message, etc.
    b. It determines what wavelength should be used for transmission. A likely approach would be to have a lookup table—given a particular destination, that would determine one of a few wavelengths on which to transmit. Another approach which can be used is for the interface unit to monitor the amount of traffic on the network (via the receivers and multiplexer), and select the least-utilized wavelength.
    c. It determines when it is "safe" to transmit the message onto the star coupler. Only one message can be "in transit" at a specific wavelength over the star coupler at any time. If two messages of the same wavelength are simultaneously are on the star at the same time, they will corrupt each other.
    The medium access control protocol used to determine when to transmit can be any one of a number of protocols. These include a random access (ethernet-like) protocol, arbitration of the same type used for electronic busses, or pre-allocated time-slot protocols (a given node can only transmit on a particular wavelength at a particular set of times, which is predetermined).
    d. When the interface unit has modified the message to include protocol information, it puts the modified message into an electronic RAM buffer memory (this is at the output of the interface unit). The buffer can contain a queue of messages—i.e.: there may be a waiting list. The queue position may be prioritized by the interface unit.
3. When the interface unit determines the wavelength for transmission, it electronically sends this information to the transmitter 12, which adjusts its wavelength to the specified value as soon as possible (ie: immediately if transmitter is idle, or immediately after completing any other messages in the queue).
4. When the interface unit determines that it's "safe" to launch a message, it sends a "GO" signal to the transmitter 12.
5. The transmitter then takes the data and converts it to an optical signal at a particular wavelength and sends it over the star coupler 16.
6. The star coupler 16 is a passive broadcast medium realized from optical fiber (glass or plastic) or optical waveguides on a chip. It distributes all input signals equally (ie: equal optical intensity) among all outputs. The key feature of the invention is that each input of the star consist of many optical waveguides or fibers in PARALLEL. That is, each arrow 28 in FIG. 1 represents a multiple of independently addressable optical signals.
7. The output of the star coupler is received by an optical filter/wavelength demultiplexer 30 at every node. This filter divides the output into multiple optical data streams—each stream at a different wavelength. Each of these streams comprises multiple independently addressable optical signals, each on a separate waveguide or fiber.
8. Each data stream is independently converted into an electronic signal by the receivers (Rx) 14.
9. The data streams are then electronically address-filtered and multiplexed. This occurs in the unlabeled trapezoid 32 between the Rx's and the interface unit. That is, if the intended destination is different from the receiving node, the message is discarded. Also, the interface unit may only be able to accept a finite number of messages per unit time—so the multiplexer provides a queue to store messages (electronic RAM buffer memory) while the interface unit takes them off the buffer.
10. The LambdaBus interface 26 unit takes the message, checks to make sure it's not corrupted, and then sends it out on the cpu bus 24 to the CC 22, which handles it from there (routes to either CPU 18 or M 20). If the message is corrupted, the interface unit takes some action which depends on the protocol being used. It can do nothing, or it can send a request for retransmission to the node which sent the message.

The invention includes the basic WDM star-coupled system, referred to as LambdaBus, rather than larger, massively parallel systems, because its scale conforms to expectations for the future multiprocessor market and needs for embedded systems on mobile platforms, while it also provides a building block for larger machines. The invention addresses the concern that the interconnect hardware provides robust, scalable performance at the level of 100 sustained GFLOPS and a few hundred nodes.

The simulations show that a single wavelength receiver 14 on each node (each node detects only one of the multiple system wavelengths) appears sufficient to support a high level of performance. The optical fiber or waveguides comprising the star coupler 16 should be multimode, that is, able to carry many (about 100 or several 100) optical modes for the wavelengths used in the system. This improves reliability and lowers cost associated with producing the optical interconnections between the nodes and the star coupler. It also reduces the attenuation at the interconnections, which enables more nodes to be connected to the star without bandwidth degradation.

While optical transmission over single-mode optical fiber (SMF) offers serialized channel transmission rates of 10–40 GHz and demonstrated potential for 100-channel WDM systems, unfortunately, such SMF technology is unsuitable for robust, cost-effective computer interconnects and embedded systems for several reasons, including the following:

Tight SMF optical alignment tolerances (0.2 $\mu$m to 2 $\mu$m for efficient coupling) increase transceiver cost and shock, vibration, particulate, and temperature sensitivities.

More optical power is required for error-free transmission at higher serial rates, sacrificing connectivity/fanout and reliability by reducing the power budget.

High-speed serialization adds complex and expensive clock recovery and multiplexing between interconnect and logic speeds. Serial data rates $\geq$2 GByte/s require $\geq$10:1 muxing to match anticipated 1 GHz logic speeds.

High serial bitrate is incompatible with multimode fiber (MMF) dispersion, which limits 8 GByte/s streams to distances <6 m. In certain applications, this constraint restricts the technology's applicability, limiting commercial development and availability.

For these reasons, the invention achieves parallel transmission over MMF optic ribbon cables. These links can provide a few GBytes/sec bandwidth with end-to-end latencies of a few nsec (excluding time-of-flight). The electrical power consumption of the required optical transceiver technology is comparable to that of high-performance electronic transceivers. The two major issues associated with building upon this technology for a LambdaBus architecture are (i) providing WDM capability and (ii) relatively high optical transceiver "costs".

While these "costs" will likely be acceptable for a small number of parallel transceiver arrays per each node, they will prove prohibitive if many arrays are required at each node—for example, if a large number of receiver circuits are used, as shown for large n in the "λn Rx's" of FIG. 1. The cost of multiple arrays includes both raw financial costs and those deriving from footprint constraints (about 1 in$^2$ per array module), the associated packaging, and n:1 multiplexing to access intranode interconnect media.

To avoid a large number of receiver modules per node (as suggested from the above cost rationale), one receiver array cannot be allocated for each system wavelength on every node. Therefore, wavelength selectable transmitter (Tx) and/or receiver (Rx) modules are required. Wavelength-selectable Rx's can be obtained by either (i) fixed 1:n optical wavelength demultiplexing to multiple receivers, followed by electronic selection of the associated WDM channel, or (ii) tunable optical demultiplexing to a single receiver module. The first approach requires many optoelectronic Rx modules and is precluded by the above cost rationale. The second approach is precluded by the slow (several 100's of nsec) tuning times of MMF WDM demultiplexers. Therefore, a system is desirable in which a few fixed wavelengths are received at each node, using fixed demultiplexers and one Rx module per received wavelength. This approach requires rapid wavelength selection of Tx wavelengths to achieve low latency, a capability not available in current versions of MMF array interconnects.

Figure 2:
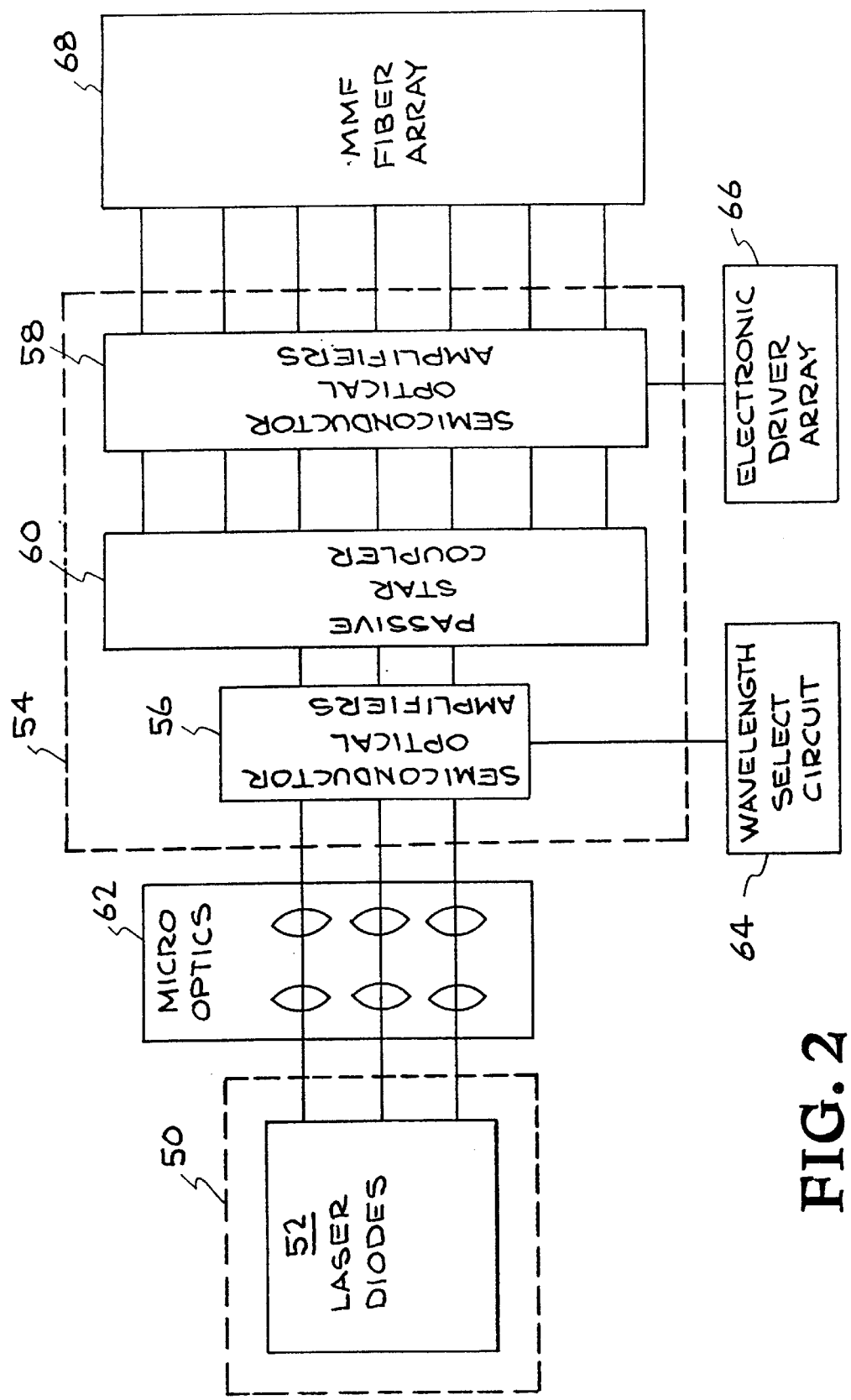
FIG. 2 shows a transmitter module.

FIG. 2 shows an embodiment of a Tx 12 module design of the present invention, which provides ≈1 nsec wavelength selection, broadcast capability, and large output power using a single module containing two optoelectronic chips. The first chip 50 contains an array of L laser diodes 52, each emitting at a different wavelength, with L equal to the total number of wavelengths in the system. The second chip 54 contains two arrays of semiconductor optical amplifiers (SOAs), 56 and 58, interconnected by a passive star coupler 60. The lasers emit continuously and may be collimated and focused by micro-optics 62. Tx wavelength is selected in the optical domain by using SOA array 56 to select Tx wavelength. Wavelength select circuit 64 controls SOA array 56. The second SOA array 58, controlled by electronic driver array 66, provides modulators to impress word-wide electronic data onto the word-wide spatial channels (MMF 68) realized via broadcast over the star coupler. This Tx module differs from other split-and-modulate approaches for single-wavelength parallel Tx's in its WDM capability and use of SOAs to provide wavelength-insensitive modulation and high power output.

The integration technologies required to realize each of the two chips have already been demonstrated at several research labs. Particular advantages leading to the design of FIG. 2 are:

Optical, rather than electronic, wavelength selection with ≈1 nsec SOA gating eliminates on-chip laser thermal transients which cause wavelength drift.

WDM multicast capability.

SOAs improve optical power budget for large fanout and hedge against degradation or high-temperature operation.

All spatial channels (MMFs) are driven with exactly the same wavelengths.

The two chip approach simplifies fabrication (only one active device type per chip), and permits the use of cleaved end facets for laser cavity feedback.

From a link-level perspective, the proposed Tx provides rapid wavelength selection with bandwidth, latency, footprint and power consumption comparable to those of the current, single-wavelength Tx modules. The number of wavelength channels L is limited by the SOA gain-bandwidth (60–90 nm) and stability constraints on the interchannel spectral spacing. It is anticipated that modules with L=16 to 64 wavelengths should prove feasible. Preliminary, proof-of-principle link demonstrations at 1 Gbit/s per fiber show low bit-error-rates <$10^{-14}$, even with a large mode selective loss. A skew is anticipated comparable to that of single-wavelength transceivers, which will limit bitrate to a few Gbit/s per fiber.

The preceding discussion leads to a LambdaBus configuration in which each node contains a single, wavelength-tunable Tx and a few fixed-wavelength Rx's. The number of system wavelengths L is less than the number of nodes N, and each node does not receive all L channels. In particular, the "lowest Rx cost" configuration is assumed in which each node receives only one wavelength channel carrying memory access traffic. While increasing the number of memory traffic wavelengths received per node will undoubtedly improve system performance, for example, by enabling snoopy or partial snoopy coherence protocols, this assumption was made to assess the performance of the minimal (low-cost) system using the simulations described below.

Figure 3A:
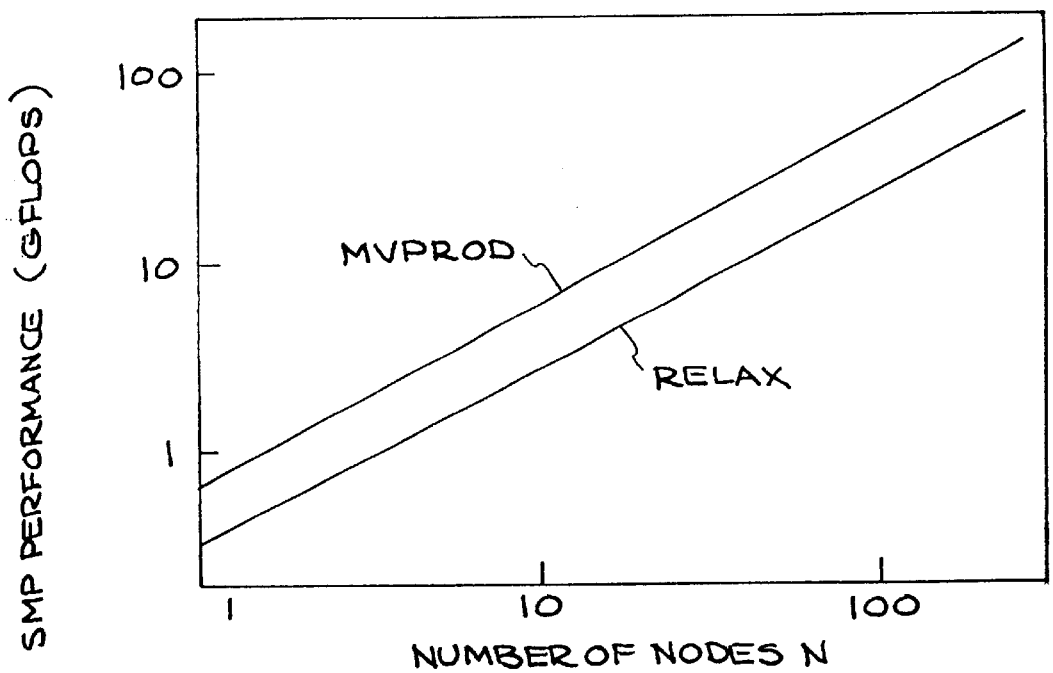
FIGS. 3A and B shows simulation results for LambdaBus performance.
Figure 3B:
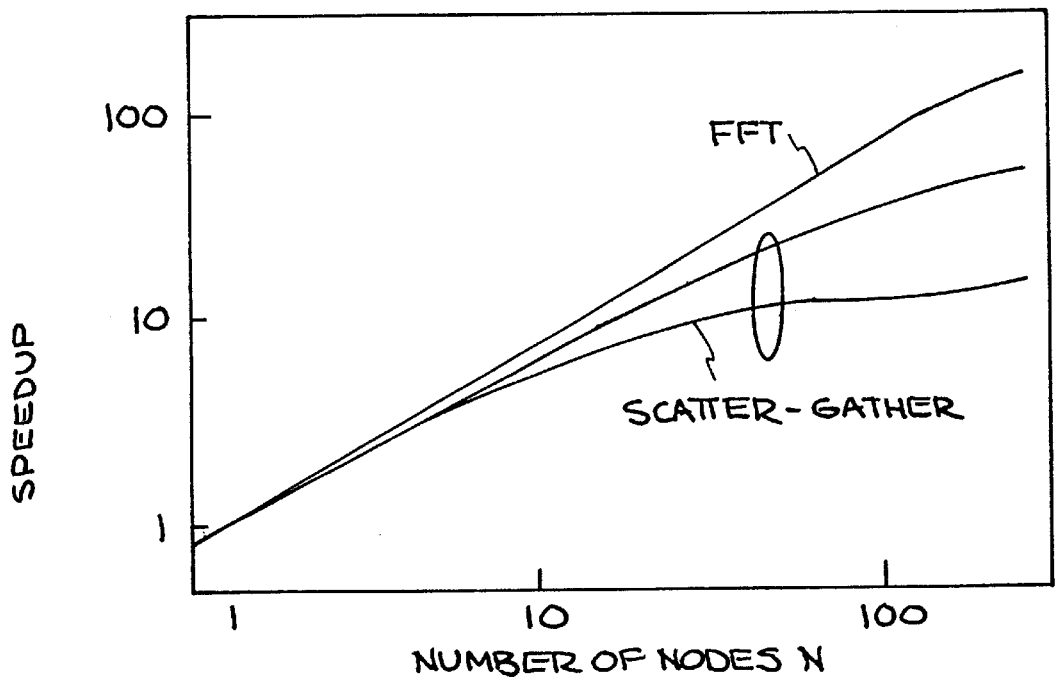

The performance of the LambdaBus system was assessed using "Cerberus," a discrete event simulator for shared memory multiprocessors, in which algorithm execution at the instruction level is simulated in time steps equal to one CPU clock. The simulation includes cache coherency based on write-invalidate, write-back, directory-based protocols, assumes that each node contains a CPU or ensemble of CPUs capable of 1 GFLOPS sustained performance, and assumes that bus arbitration mechanisms are used for medium access control of messages onto the star coupler. Simulated performance is shown in FIGS. 3A and 3B for four algorithms of relevance to scientific computing and signal processing: matrix-vector multiplication, 9-point stencil relaxation, two-dimensional fast-Fourier transform, and scatter-gather for a finite element calculation. FIG. 3A shows performance in GFLOPS (MVPROD, RELAX) and FIG. 3B shows speedup (FFT, scatter-gather) as a function of the number of ≈1 GFLOPS nodes in the system, for an interconnect with L=8 or 32 busses, each with $B_L$=8 GByte/s bandwidth. A low complexity LambdaBus system utilizing only 8 system wavelengths in it's minimum cost configuration (only one wavelength received per node) exhibits scalable performance, that is, a monotonic increase in performance or speedup as the number of system nodes increases.

The invention is a robust, high-performance transceiver technology for star-coupled, optical interconnects based on WDM transport over multimode fiber ribbon cables. It has been shown that this approach enables multiprocessor scaling to at least 256 nodes and about 100 GFLOPS sustained performance for some algorithms. Because the proposed transceiver's wavelength tuning latency is less than that required for bus arbitration, WDM tuning does not impact system performance. The results quantify requirements on the optical bus in order to realize such systems. Only a moderate number (8 to 32) of wavelengths, each supporting a moderate link bandwidth of ≈4 to 8 GByte/s, are required. Furthermore, each node needs only a single optical bus receiver operating at a fixed wavelength. These parameters are well within the capabilities of the proposed technology.

Changes and modifications in the specifically described embodiments can be carried out without departing from the scope of the invention, which is intended to be limited by the scope of the appended claims.

What is claimed is:

1. A communications architecture comprising a set of nodes interconnected by a broadcast medium, wherein every node comprises an optical communications transmitter which can transmit at a variable optical wavelength, wherein every node can receive on a set of fixed wavelengths, wherein said broadcast medium allows each communication signal from a given node to be simultaneously sent to every other node, and wherein said broadcast medium comprises fiber optic ribbon cables selected from a group consisting of multiple, parallel strands of optical fiber and optical waveguides, wherein said optical communications transmitter is capable of bit-parallel transmission, wherein said transmitter comprises an unmodulated light source that is wavelength variable by user control, an optical power splitting arrangement which generates multiple spatial channels (multiple beams of light), and an array of modulators which accepts a user-controlled electrical input and impresses the applied electrical signals as a modulation on the optical beams in each of the spatial channels created by said optical power splitting arrangement.

2. The communications architecture of claim 1, wherein each modulator in said array of modulators comprises optical amplifiers, wherein modulation is achieved by energizing/de-energizing the amplifiers.

3. The communications architecture of claim 1, wherein said optical power splitting arrangement comprises a star coupler.

4. The communications architecture of claim 3, wherein said star coupler comprises an input having an optical amplifier.

5. The communications architecture of claim 1, wherein said optical power splitting arrangement comprises a cascaded tree of optical couplers.

6. The communications architecture of claim 1, wherein said unmodulated light source comprises an array of optical sources, wherein each optical source of said array of optical sources produces a different wavelength, wherein an optical transmission wavelength is varied by selectively energizing a subset of said array of optical sources.

7. The communications architecture of claim 6, wherein each optical source comprises an output having an optical amplifier.

8. The communications architecture of claim 6, wherein said optical power splitting arrangement comprises a star coupler, and wherein said star coupler and said modulators are integrated onto a single chip.

9. The communications architecture of claim 6, wherein said optical power splitting arrangement comprises a star coupler, wherein said power splitting arrangement further comprises optical amplifiers to increase the signal power wherein said star coupler, said modulators and said optical amplifiers are integrated onto a single chip.

10. The communications architecture of claim 1, wherein said unmodulated light source comprises an array of optical sources, wherein each optical source of said array of optical sources produces a different wavelength, wherein an optical transmission wavelength is varied by selectively switching between subsets of said array of optical sources using electro-optic switches.

11. The communications architecture of claim 10, wherein said electro-optic switches are optical amplifiers which are selectively energized.

12. The communications architecture of claim 1, wherein said unmodulated light source is wavelength-tunable by electro-optic means.

13. The communications architecture of claim 1, wherein said optical power splitting arrangement comprises optical amplifiers to increase the signal power.

* * * * *